(12) United States Patent
Nikitin et al.

(10) Patent No.: US 9,990,518 B2
(45) Date of Patent: Jun. 5, 2018

(54) SYSTEMS AND METHODS FOR CONTROLLING RADIO-FREQUENCY INDENTIFICATION (RFID) TAG COMMUNICATION

(71) Applicant: INTERMEC, INC., Lynnwood, WA (US)

(72) Inventors: Pavel Nikitin, Seattle, WA (US); Stephen J. Kelly, Marion, IA (US); Rene Martinez, Seattle, WA (US)

(73) Assignee: INTERMEC, INC., Lynnwood, WA (US)

( * ) Notice: Subject to any disclaimer, the term of this patent is extended or adjusted under 35 U.S.C. 154(b) by 0 days. days.

(21) Appl. No.: 15/343,553

(22) Filed: Nov. 4, 2016

(65) Prior Publication Data

US 2018/0129834 A1    May 10, 2018

(51) Int. Cl.
*G05F 3/06*          (2006.01)
*G06K 7/10*         (2006.01)

(52) U.S. Cl.
CPC ................ *G06K 7/10019* (2013.01)

(58) Field of Classification Search
CPC .................................. G06K 7/10019
See application file for complete search history.

(56) References Cited

U.S. PATENT DOCUMENTS

| | | |
|---|---|---|
| 5,649,295 A | 7/1997 | Shober et al. |
| 6,243,013 B1 | 6/2001 | Duan et al. |
| 6,265,962 B1 | 7/2001 | Black et al. |
| 6,456,668 B1 | 9/2002 | MacLellan et al. |
| 6,802,659 B2 | 10/2004 | Cremon et al. |
| 7,304,579 B2 | 12/2007 | Diorio et al. |
| 7,525,438 B2 | 4/2009 | Hyde et al. |
| 7,952,464 B2 | 5/2011 | Nikitin et al. |
| 8,207,828 B2 | 6/2012 | Hanebeck |
| 8,253,539 B2 | 8/2012 | Scaramozzino |
| 8,258,920 B2 | 9/2012 | Crucs |
| 8,416,079 B2 | 4/2013 | Roesner |
| 8,564,412 B2 | 10/2013 | Nikitin et al. |

(Continued)

OTHER PUBLICATIONS

Nikitin et al; "UHF RFID Tag Characterization: Overview and State-of-the-Art;" AMTA Conference, Seattle, Washington; Oct. 2012; 6 pp.

(Continued)

*Primary Examiner* — Joseph Feild
*Assistant Examiner* — Pameshanand Mahase
(74) *Attorney, Agent, or Firm* — Oliff PLC; R. Brian Drozd (57) ABSTRACT

Systems and methods for radio-frequency identification (RFID) tag communication are provided. One radio-frequency identification (RFID) tag includes a communication device configured to communicate with an RFID reader and an impedance element configured to change an variable impedance of the RFID tag. The RFID tag further includes at least one switch connected to the impedance element and a controller connected to the at least one switch and configured to control operation of the switch between open and closed states based on a control signal received from the RFID reader, wherein the variable impedance of the RFID tag is changed between a first modulating impedance value and a second modulating impedance value when the switch is changed between the open and closed states.

20 Claims, 9 Drawing Sheets

(56) References Cited

U.S. PATENT DOCUMENTS

| | | | |
|---|---|---|---|
| 9,055,798 B2 | 6/2015 | Scicluna | |
| 9,082,057 B2 | 7/2015 | McGregor | |
| 9,165,170 B1 | 10/2015 | Gutnik et al. | |
| 9,317,729 B2 | 4/2016 | Krusor et al. | |
| 9,514,402 B1 * | 12/2016 | Kim | H01Q 1/2225 |
| 2004/0263319 A1 | 12/2004 | Huomo | |
| 2005/0052279 A1 * | 3/2005 | Bridgelall | G06K 7/0008 |
| | | | 340/10.1 |
| 2005/0237198 A1 | 10/2005 | Waldner et al. | |
| 2006/0133175 A1 * | 6/2006 | Gutnik | G06K 19/0723 |
| | | | 365/225.7 |
| 2006/0163370 A1 | 7/2006 | Diorio et al. | |
| 2007/0194914 A1 | 8/2007 | Gates | |
| 2008/0303633 A1 * | 12/2008 | Cheng | G06K 7/10178 |
| | | | 340/10.1 |
| 2010/0123581 A1 | 5/2010 | Hatfield et al. | |
| 2011/0205026 A1 * | 8/2011 | Bateman | G06K 7/0008 |
| | | | 340/10.1 |
| 2012/0211560 A1 | 8/2012 | Su et al. | |
| 2014/0001876 A1 * | 1/2014 | Fujiwara | H02J 17/00 |
| | | | 307/104 |
| 2014/0016719 A1 * | 1/2014 | Manku | G06K 19/0723 |
| | | | 375/295 |
| 2014/0045425 A1 * | 2/2014 | Roh | H04B 5/0012 |
| | | | 455/41.1 |
| 2014/0176307 A1 | 6/2014 | Forster | |
| 2015/0379459 A1 | 12/2015 | Russell et al. | |
| 2016/0364642 A1 * | 12/2016 | Viala | H01Q 1/2225 |

OTHER PUBLICATIONS

Nikitin et al; "Effect of Gen2 Protocol Parameters on RFID Tag Performance;" IEEE RFID Conference, Orlando, Florida; Apr. 2009; 6 pp.

Pillai et al; "A Technique for Simultaneous Multiple Tag Identification;" IEEE Workshop on Automatic Identification Advanced Technologies; Oct. 2005; pp. 35-38.

Nikitin et al; "Differential RCS of RFID tag;" Electronics Letters; Apr. 12, 2007; vol. 43; No. 8; 2 pp.

Nikitin et al; "Power Reflection Coefficient Analysis for Complex Impedances in RFID Tag Design;" IEEE Transactions on Microwave Theory and Techniques; Sep. 9, 2005; vol. 53; No. 9; pp. 2721-2725.

D'Orazio; "Pitt researchers' NFC and RFID cards feature a touch-sensitive on/off switch;" The Verge; Feb. 19, 2012; retreived from http://www.theverge.com/2012/2/19/2809205/nfc-rfid-credit-card-on-off-switch.

"UCODE;"May 21, 2015; retrieved from http://www.nxp.com/products/identification-and-security/smart-label-and-tag-ics/ucode:MC_50483.

U.S. Appl. No. 15/622,839, filed Jun. 14, 2017 in the name of Nikitin et al.

U.S. Appl. No. 15/637,520, filed Jun. 29, 2017 in the name of Nikitin et al.

Mar. 27, 2018 Office Action issued in U.S. Appl. No. 15/637,520.

* cited by examiner

SYSTEMS AND METHODS FOR CONTROLLING RADIO-FREQUENCY INDENTIFICATION (RFID) TAG COMMUNICATION

BACKGROUND

Handheld or mobile computers are widely used, such as in different field mobility environments. For example, these computing devices may be used by mobile field service and transportation workers to allow different types of mobile operations, such as in-field computing, radio frequency identifier (RFID) scanning, barcode scanning, and communication with remote external devices, among others.

For RFID scanning, RFID scanners may use one or more RFID methods for different applications, including for smart cards, supporting maintenance tasks, identification badges, tracking objects in manufacturing, retail inventory management, etc. An RFID tag can be attached, e.g., to an inventory object. An RFID apparatus can be configured with an RFID reading device including one or more antennas to read the memory of an RFID tag attached to an inventory object.

The RFID apparatus may be a handheld device with integrated RFID reading capabilities that can read RFID tags from a range of distances, such as during a retail floor inventory operation. It is desirable to have reliable communication links between the RFID apparatus and the RFID tags, which may include numerous RFID tags responding at the same time. In RFID systems, both forward (reader-to-tag) and reverse (tag-to-reader) links are important. In operation, the overall system performance can be limited either by the tag sensitivity ("tag-limited" or "forward-limited") or by the reader sensitivity ("reader-limited" or "reverse-limited").

In practical scenarios, it is desirable to have the RFID systems (reader and tag) operating robustly with enough RF margins on both forward and reverse links, so that the tag does not drop out suddenly if the environment or the distance to the tag changes. In addition, sometimes during a singulation stage (setup process), multiple tags backscatter at the same time and signals from several tags collide at the reader. In most cases, the multiple signals cannot be simultaneously resolved by the reader because the backscatter modulating impedances of the tags are fixed and cannot be changed, thus slowing down the tag singulation and identification process.

Thus, because of the limitations of conventional devices and methods, communication between the reader and multiple tags may be interrupted or not operate satisfactorily, thus resulting in extra time and expense in the RFID communication process.

SUMMARY

To overcome these and other challenges, aspects of broad inventive principles are disclosed herein.

In one embodiment, a radio-frequency identification (RFID) tag includes a communication device configured to communicate with an RFID reader and an impedance element configured to change an variable impedance of the RFID tag. The RFID tag further includes at least one switching element connected to the impedance element and a controller connected to the at least one switching element and configured to control operation of the switching element between open and closed states based on a control signal received from the RFID reader, wherein the variable impedance of the RFID tag is changed between a first modulating impedance value and a second modulating impedance value when the switching element is changed between the open and closed states.

In one embodiment, a radio-frequency identification (RFID) tag is provided that includes an impedance element configured to change a modulating impedance value of the RFID tag and a controller connected to the impedance element and configured to dynamically adjust the modulating impedance value by controlling operation of the impedance element.

In one embodiment, a method is provided that includes setting a modulating impedance value for each of a plurality of RFID tags using one or more broadcast command signals. The method also includes dynamically changing the impedance value of at least one of the RFID tags based on a detected backscatter collision between two signals received by an RFID reader at the same time from different RFID tags.

DETAILED DESCRIPTION

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various embodiments include a control arrangement, architecture and method for controlling RFID tag communications, including transmissions from RFID tags to an RFID reader. In some embodiments, RFID system performance is improved or optimized by providing RFID tags that have variable modulating impedances that can be dynamically adjusted to thereby improve or optimize system performance. In use, when RFID communication is performed with RFID tags in accordance with one or more embodiments, improved system performed is provided with increased tag sensitivity and/or the ability to resolve multiple tags that backscatter at the same time, such as during a singulation or other communication setup stage of communication.

Singulation generally refers to a method by which an RFID reader identifies a tag with a specific serial number from a number of tags in its field. The singulation process is used to allow multiple tags to respond simultaneously to a query (e.g., RFID read signal) without interference or jamming each other.

In various embodiments, the variable modulating impedance is changed on-the-fly, in realtime or dynamically to allow for more robust communication between the RFID reader and plural RFID tags that are responding (backscattering) at the same time. As described in more detail herein, using the various embodiments, RF link margins also may be adjusted to allow for communication with plural RFID tags at the same time. For example, using various embodiments, a more robust RFID scanner may be provided that more reliably reads plural RFID tags (e.g., plural items on a retail shelf each having an associated RFID tag).

It should be noted that while the various embodiments are described in connection with particular RFID readers and RFID tags having particular operating characteristics, the various embodiments are not limited to the RFID readers or RFID tags, or to any particular operating environment. Thus, one or more embodiments may be used in connection with different RFID readers or RFID tags in, for example, different scanning settings.

Additionally, handheld or portable computing devices can be used in many different applications. Accordingly, while various embodiments may be described in connection with communicating with plural RFID tags to identify items or inventory in a particular environment, the various embodiments are not so limited. For example, various embodiments may be used to identify or locate different types of RFID tags or items to which RFID tags are coupled.

Figure 1:
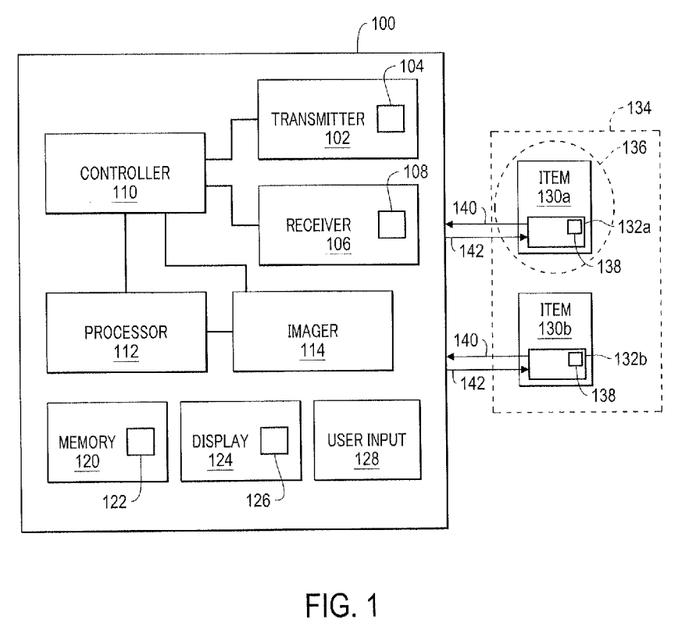
FIG. 1 is a block diagram of an RFID reader system and RFID tags according to one or more embodiments.

One embodiment of a RFID reader system 100 is shown in FIG. 1. The system 100 may be embodied as or form part of a handheld RFID scanner. For example, the system 100 may be embodied or form part of a mobile computing device, such as an Intermec mobile computer available from Honeywell Scanning and Mobility.

The RFID reader system 100 can comprise a transmitter 102 having one or more transmit antennas 104 and a receiver 106 having one or more receive antennas 108. It should be noted that although one transmit antenna 104 and one receive antenna 108 are illustrated, the system 100 can comprise additional transmit or receive antennas 104, 108.

The transmitter 102 and receiver 106 are selectively activated (e.g., selectively turned on and off) to scan a region of interest 134 to acquire RFID tag information. The transmitting and receiving may be performed using RFID scanning techniques in the art. As discussed herein, simultaneously received signals from the region of interest 134 (e.g., multiple backscatter signals) at the same time can be resolved and processed by the RFID reader system 100.

The system 100 can also comprise a controller 110 coupled to the transmitter 102 and receiver 106. It should be noted that any type of communicative or operative coupling may be used, such as any type of wireless or wired communication. The controller 110 is configured to control the operation of the transmitter 102 and receiver 106, such as to control the transmissions by the transmit antenna 104 and the reception by the receive antennas 108. In one embodiment, the controller 110 is a transmit and receive controller configured to control the radio-frequency (RF) pulses sent to the transmit antenna 102 and the communication of signals received by the receive antennas 108. However, as described in more detail herein, the controller is also configured to control other components of the system 100.

The system 100 can further comprise a processor 112 coupled to the controller 110. As described in more detail herein, the processor 112 can control the operation of the controller 110 to transmit and receive as desired or needed, including resolving signals received from multiple RFID tags 132 at the same time. For example, in some embodiments, the processor 112 is configured in various embodiments to control the impedance used by the RFID tags 132 when communicating with the system 100 to allow more robust communication with the RFID tags 132. For example, in some embodiments, the processor 112 is configured to process received signal information, such as backscattered information used to determine tag data for one or more RFID tags using optimized link margins dynamically adjusted using variable impedance modulation of the RFID tags.

For example, the system 100 may communicate with plural RFID tags 132 in the region of interest 134, which may be a portion of a storage facility having a large number of RFID tagged objects or items. The illustrated embodiment shows two items 130a, 130b that have a corresponding RFID tag 132a, 132b coupled thereto for simplicity. However, it should be appreciated that many more tagged items may be located within the region of interest 134, with plural RFID tags 132 responding at the same time. Also, the RFID tag 132 may be affixed directly to the item 130 or a packaging of the item using techniques in the art.

The processor 114 is configured to receive tag response and/or read information including backscattered information over optimized RF link margins as described herein, which in some embodiments includes receiving read tag responses that are communicated over an RF link with a variably controlled impedance for each of the RFID tags 132. As discussed in more detail herein, the system 100 may be used to control a variable impedance state of each of the RFID tags 132.

For example, in various embodiments, the RFID tags 132 include a variable modulator 138 that includes one more impedance modulating devices as described in more detail herein. The controller 110 of the system 100 is further configured to control the impedance modulation of the variable modulator 138 to adjust the phase of a backscatter state and/or RF link margins between the system 100 and the RFID tags 132. In some embodiments, to determine the optimal RF link margins, the RFID tags 132 interact with the system 100 (essentially querying the system 100 as to whether the system 100 is receiving the signal from the RFID tag 132) while dynamically adjusting a modulating impedance until the RFID tag 132 arrives at an improved or optimal value where there are desired margins on both forward links 140 and reverse links 142 in the RF link budget of RFID system (e.g., the total available RF bandwidth).

For example, during communication between the system 100 and RFID tags 132, collisions between received signals may occur, such as when two tag responses, from the RFID tag 132a and the RFID tag 132b collide at the system 100. In this collision, the angle between tag constellations on the IQ plane is fixed (determined by the propagation environment). As a result, in general both in-phase (I) and quadrature (Q) received signal components contain a mixture of signal components from the RFID tag 132a and the RFID tag 132b. However, tag data can only be decoded when the angle between constellations is large (ideally, close to 90 degrees, as described herein). Small angles between tag constellations are very common in noisy RFID environment. Using variable impedance modulation in accordance with various embodiments, the angle between constellations is adjusted to allow for resolving tag data received from both the RFID tag 132a and the RFID tag 132b simultaneously or concurrently.

Referring again to the system 100, a memory 120, which may be any type of electronic storage device, can be coupled to the processor 112 (or form part of the processor 112). The processor 112 may access the memory 112 to obtain tag identification information, or other information, used when communicating with of the RFID tags 132.

The system 100 can also comprise a display 124 and user input device 128 coupled to the processor 112 to allow user interaction with the system 100. For example, the display 124 can allow visualization of the RFID tags 132 that are responding and that may be attached to an item of interest. One or more user inputs may also be received at the user input device 124 (e.g., keyboard, mouse, touchpad, etc.) to control the system 100. As described in more detail herein, in some embodiments, using variable impedance modulation of the RFID tags 132, multiple items of interest may be identified at the same time.

It should be noted that in some embodiments, the display 122 and user input device 124 may be integrated, such as in a touchscreen display device.

While FIG. 1 illustrates a particular connection arrangement of the various components, a skilled artisan would appreciate the fact that other connection arrangements may be made that are within the scope of this disclosure. Additionally, the various components may be housed within the same or different physical units and the separation of components within FIG. 1 is merely for illustration.

The system 100 can also comprise one or more communication subsystems to allow communication with external devices, such as networks, printers, etc. Thus, additional components may form part of or communicate with the system 100.

Figure 2A:
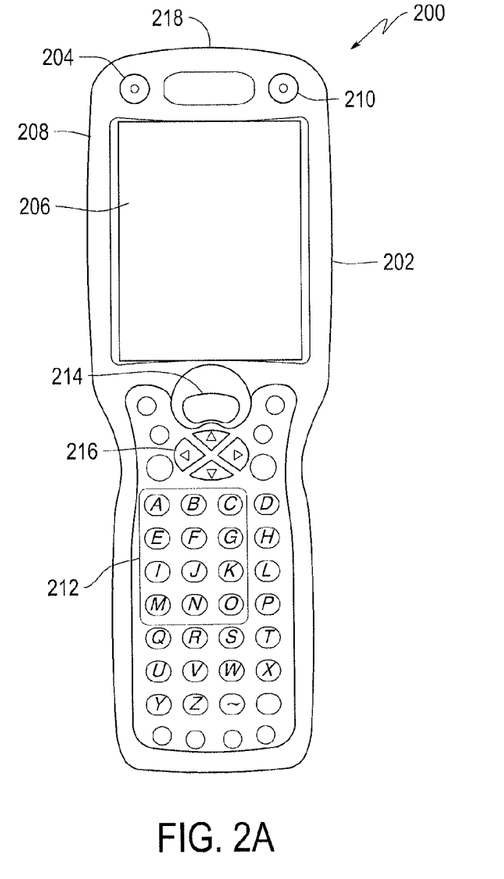
FIGS. 2A, 2B and 2C schematically illustrate an RFID apparatus according to one embodiment.
Figure 2B:
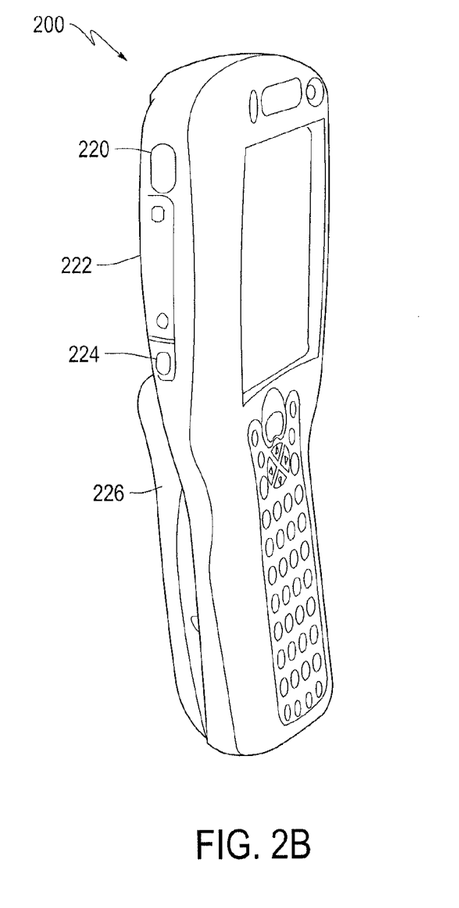
Figure 2C:
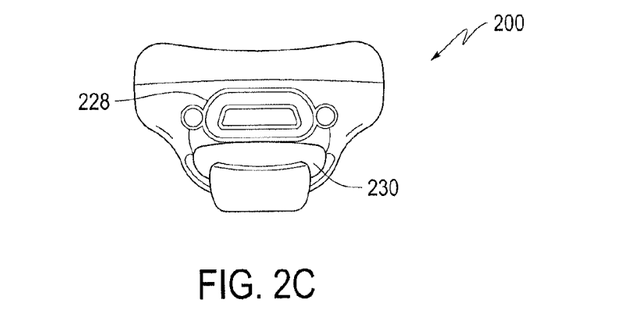

In some embodiments, the system 100 may be embodied as part of a RFID apparatus 200 is shown in FIG. 2A (front panel view), 2B (oblique panel view) and 2C (bottom panel view). The RFID apparatus 200 can comprise a housing 202 within which other components of RFID reader 200 can be disposed. An LCD screen display with touch screen sensor 206 can be disposed on a front panel 208. Also disposed on the front panel 208 can be an operation LED 204, a scan LED 210, and keyboard 212 including a scan key 214 and navigation keys 216. An imaging window 218 can be disposed on the top panel of the housing 202. Disposed on the side panel (best viewed in FIG. 2B) can be an infrared communication port 220, an access door to a secure digital (SD) memory interface 222, an audio jack 224, and a hand strap 226. Disposed on the bottom panel (best viewed in FIG. 1C) can be a multi-pin mechanical connector 228 and a hand strap clip 230.

In various embodiments, the imaging window 218 allows an imaging system, within the housing 202 to be behind the imaging window 218 for protection to have a field of view in front of the RFID apparatus 200. In some embodiments, an illuminator (not shown) may also be disposed within housing 202 behind the protective imaging window 218 in a cooperative manner with the camera system. In one embodiment, the imaging window 218 may include a fisheye lens or other lens to provide a panoramic or wider view to ensure that a camera can capture images of, for example, the region of interest 134 (shown in FIG. 1).

Also disposed on the bottom panel (or alternatively on the top panel) can be an RFID antenna housing and an RFID read device (which may can include the transmitter 102 and receiver 106 shown in FIG. 1) within the housing 202.

While FIGS. 1A-1C illustrate one embodiment of a handheld housing, a skilled artisan would appreciate that other types and form factors of terminal housings are within the scope of this disclosure.

In some embodiments, the system 100 and/or RFID apparatus 200 can be incorporated in a data collection system. The data collection system, schematically shown in FIG. 3, can include a plurality of routers 302a-302z, a plurality of access points 304a-304, and a plurality of RFID apparatus 200a-200z in communication with a plurality of interconnected networks 308a-308z. In one embodiment, the plurality of networks 308a-308z can include at least one wireless communication network. In one or more embodiments, one or more of the RFID apparatus 200 can comprise a communication interface which can be used by the RFID apparatus 200 to connect to the one or more of the networks 308a-308z. In one embodiment, the communication interface can be provided by a wireless communication interface.

Figure 3:
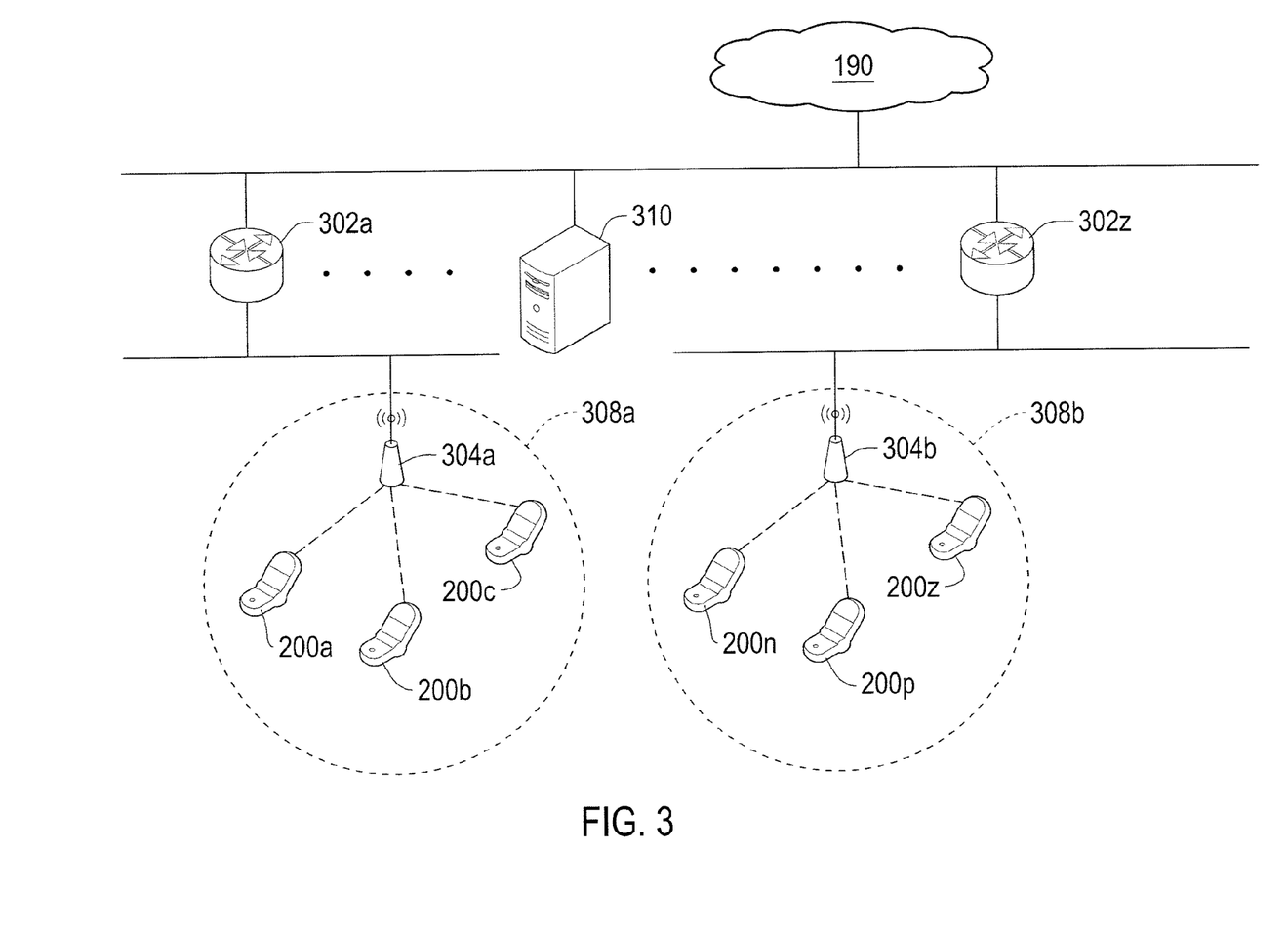
FIG. 3 is a block diagram of a network-level layout of a data collection system utilizing one or more RFID apparatus according to one embodiment.

One or more of the RFID apparatus 200 can establish communication with a host computer 310. In one embodiment, network frames can be exchanged by the RFID apparatus 200 and the host computer 310 via one or more routers 302, base stations, and other infrastructure elements. In another embodiment, the host computer 310 can communicate with the RFID apparatus 200 via a network 308, such as a local area network (LAN). In yet another embodiment, the host computer 310 can communicate with the RFID apparatus 200 via a network 308, such as a wide area network (WAN). A skilled artisan should appreciate that other methods of providing interconnectivity between the RFID apparatus 200 and the host computer 310 relying upon LANs, WANs, virtual private networks (VPNs), and/or other types of network are within the scope of this disclosure.

In one embodiment, the communications between the RFID apparatus 200 and the host computer 310 can comprise a series of HTTP requests and responses transmitted over one or more TCP connections. In one embodiment, the communications between the RFID apparatus 200 and the host computer 310 can comprise VoIP traffic transmitted over one or more TCP and/or UDP ports. A skilled artisan should appreciate that using other transport and application level protocols is within the scope of this disclosure.

Figure 4:
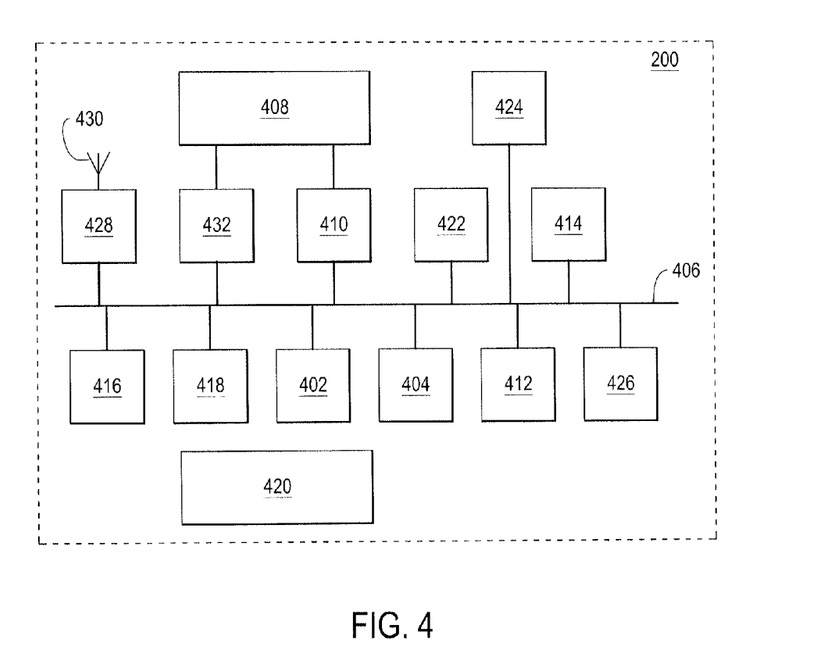
FIG. 4 is a block diagram of a component-level layout of an RFID apparatus according to one embodiment.

A component-level diagram of one embodiment of an RFID apparatus 200 will now be described with reference to FIG. 4. The RFID apparatus 200 can comprise at least one microprocessor 402 and a memory 404 (which may be embodied as the memory 120 shown in FIG. 1), both coupled to a system bus 406. The microprocessor 402 can be provided by a general purpose microprocessor or by a specialized microprocessor (e.g., an ASIC). In one embodiment, the RFID apparatus 200 can comprise a single microprocessor which may be referred to as a central processing unit (CPU). In another embodiment, the RFID apparatus 200 can comprise two or more microprocessors, for example, a CPU providing some or most of the RFID apparatus functionality and a specialized microprocessor performing some specific functionality (e.g., tag location determination as described herein). A skilled artisan should appreciate that other schemes of processing tasks distributed among two or more microprocessors are within the scope of this disclosure. The memory 404 can comprise one or more types of memory, including but not limited to random-access-memory (RAM), non-volatile RAM (NVRAM), etc.

The RFID apparatus 200 can further comprise a communication interface 408 communicatively coupled to the system bus 406. In one embodiment, the communication interface 408 may be by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/IxEV-DO protocol family.

A module 410 is an additional modular component that can be replaced with upgraded or expanded modules and is coupled between the system bus 308 and the communication interface 408. This module 410 is compatible with, for example, auxiliary hard drives (including flash memory), RAM, communication interfaces, etc.

The RFID apparatus 200 can further comprise a camera system and an image interpretation and processing module 414. In one embodiment, the image interpretation and processing module 414 receives image data from the camera system 412 and processes the information for use in determining the location of one or more RFID tags and presenting an image corresponding to that determined location. In another embodiment, the processing module 414, which is coupled to the system bus 406, exchanges data and control information with the microprocessor 402 or the memory 404.

The RFID apparatus 200 can further comprise a keyboard interface 416 and a display adapter 418, both also coupled to the system bus 406. The RFID apparatus 200 can further comprise a battery 420. In one embodiment, the battery 420 may be a replaceable or rechargeable battery pack.

The RFID apparatus 200 can further comprise a GPS receiver 422 to facilitate providing location information relating to the RFID apparatus 200. The RFID apparatus 200 can also comprise at least one connector 424 configured to receive, for example, a subscriber identity module (SIM) card. The RFID apparatus 200 can further comprise one or more illuminating devices 426, provided by, for example, but not limited to, a laser or light emitting diode (LED). The RFID apparatus 200 still further can comprise one or more encoded indicia reading (EIR) devices 428 provided by, for example, but not limited to, an RFID reading device, a bar code reading device, or a card reading device. In one embodiment, the RFID apparatus 200 can be configured to receive RFID scanning information, such as responses received from activated RFID tags.

It should be appreciated that devices that read bar codes, read RFID tags, or read cards bearing encoded information may read more than one of these categories while remaining within the scope of this disclosure. For example, a device that reads bar codes may include a card reader, and/or RFID reader; a device that reads RFID tags may also be able to read bar codes and/or cards; and a device that reads cards may be able to also read bar codes and/or RFID. For further clarity, the primary function of a device may involve any of these functions in order to be considered such a device; for example, a cellular telephone, smartphone, or PDA that is capable of reading bar codes or RFID tags is a device that reads bar codes or RFID tags for purposes of this disclosure.

The EIR device 428 may be configured to read RFID tags and acquire different types of information, for example, backscattered phase information as described herein and communicate such information to the microprocessor 402 or memory 404. In another embodiment, the EIR device 428 can be configured to adjust the RFID transmit power level. Signals transmitted from or received by the RFID apparatus 200 may be provided via an antenna 430.

In some embodiments, the RFID apparatus 200 includes an inertial measurement unit (IMU) 432 (containing one or more of a 3-axis accelerometer, a 3-axis magnetometer and a 3-axis gyroscope sensor which may provide orientation information) utilized to record the position of the RFID apparatus 200 in three dimensional space. The IMU 432 also assists the RFID apparatus 200 in determining the orientation thereof, during the process of scanning for RFID tags as the RFID apparatus 200 moves through space. The orientation of the RFID apparatus 200 includes the position of the RFID apparatus 200 itself relative to a physical structure.

The RFID apparatus 200 can be at a given position, for example ($x_1$, $y_1$, $z_1$) but the orientation of the RFID apparatus at this position may vary. The RFID apparatus 200 may be held upright at a position to define one orientation, but the RFID apparatus 200 may also be moved to an angle relative to any direction in three dimensional space (while the position of the RFID apparatus 200 is unchanged). This movement represents a change in orientation. In one embodiment, during the scanning process, both the position and the orientation of the RFID apparatus 200 are calculated by the camera system 412 and/or the IMU 432 and the resultant data is stored and may be used to facilitate locating an item 130 (shown in FIG. 1) or positioning the RFID apparatus 200 as described in more detail herein.

As described herein, various embodiments allow for the resolving RFID data received from multiple RFID tags 132 at the same time. As such, data acquired from multiple RFID tags 132 may be determined using dynamic variable impedance control as described herein. During scanning, the RFID apparatus 200 (which may be embodied as the system 100) is configured to instruct the RFID tags 132 to go through several modulating impedance states, which are defined by the variable modulator 138 of each of the RFID tags 138. In some embodiments, when the RFID apparatus 200 (e.g., RFID reader) detects a tag collision that the RFID apparatus 200 cannot resolve (e.g., because the angle between constellations is small), the RFID apparatus 200 can instruct one of the RFID tags 132 to use a different modulating impedance by sending one more control signals either to the individual RFID tag 132 (using the unique identification (ID) for the RFID tag 132) or by broadcasting a control signal. When the RFID tag 132 changes a modulating impedance, this changes the phase of the backscatter state and rotates one of the tag constellations on IQ plane, thus changing the angle between tag constellations in IQ plane. Accordingly, the RFID apparatus 200 is able to decode multiple tag signals at the same time after the angle between the tag constellations has been changed as described herein.

Thus, in various embodiments, instead of analyzing constellations to count the number of RFID tags 132, RFID apparatus 200 is able to effectively resolve collisions. As discussed herein, the angle between tag constellations is controlled that does not require a change or control of the timing for the signal communication. In operation, by controlling the angle between tag constellations, the likelihood of losing tag detection is reduced. For example, by adjusting the RF link margins, various embodiments provide for sufficient margin on both the forward and reverse links 140 and 142 such that communication with the RFID tags 132 is not lost, which is described in more detail below. Moreover, using various embodiments, an improved singulation process may be provided as also described in more detail below. It should be noted that the various embodiments described herein can be used for any modulated backscatter systems (both semi-passive and passive) and can result in higher performing robust UHF RFID systems with tag collision resolution capability.

Figure 5:
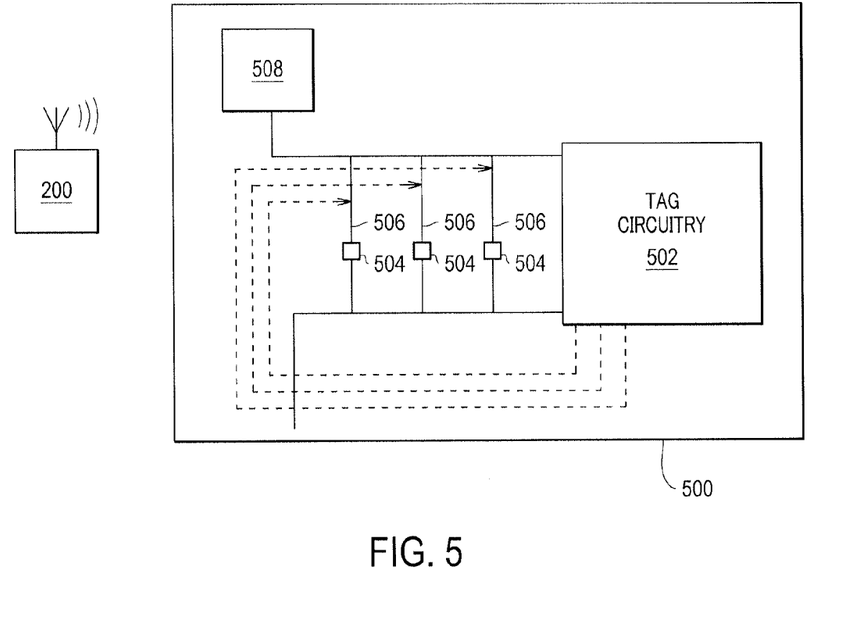
FIG. 5 is a diagram of an RFID tag in accordance with an embodiment.
Figure 6:
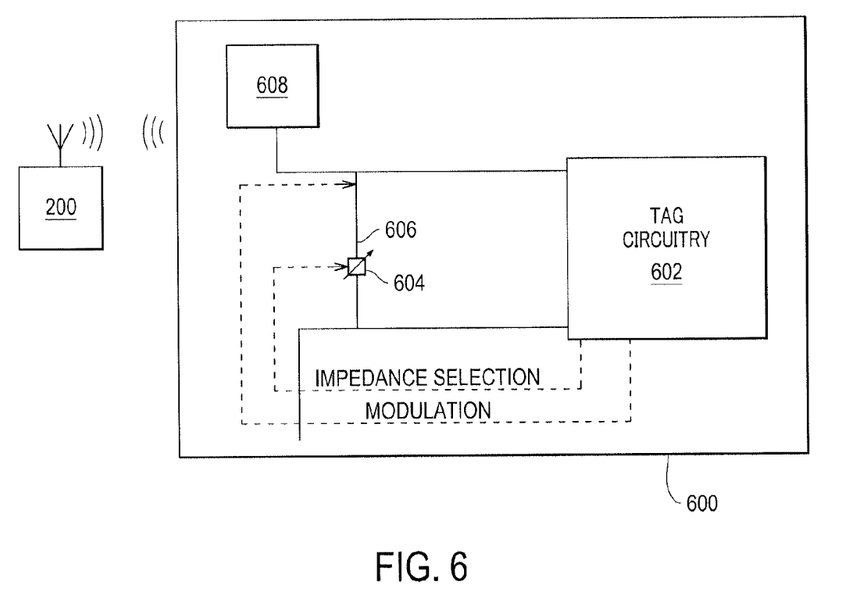
FIG. 6 is a diagram of an RFID tag in accordance with an embodiment.

FIGS. 5 and 6 illustrate RFID tags 500 and 600, respectively that are configured for modulating an impedance thereof. The RFID tags 500 and 600 include a controller, illustrated as tag circuitry 502 and 602 (which may include an RFID integrated circuit (RFID IC)), respectively that controls communication to and from the RFID tags 500 and 600 (using communication control schemes in the RFID communication technology) and also allows for the dynamic control of the modulating impedance of the RFID tags 500 and 600. The RFID apparatus 200 may communicate with the RFID tag 500 or the RFID tag 600 by sending an RFID signal addresses to the tag circuitry 502 and 602 using a unique ID associated with the tag circuitry 502 and 602 for the RFID tag 500 or the RFID tag 600. The determination of the IDs associated with each of the tag circuitry 502 and 602, and thus, with each of the RFID tag 500 or the RFID tag 600, may be stored in a lookup table or other memory (such as the memory 120 shown in FIG. 1) to allow for lookup of the IDs for each of the RFID tag 500 or the RFID tag 600. Thus, in operation, the RFID tag 500 or the RFID tag 600 and can be controlled using RFID control signals that allow for dynamically adjusting the modulating impedance for the RFID tag 500 or the RFID tag 600.

For example, a unique bit value may be written to a memory field of the tag circuitry 502 and 602 (by sending an RFID signal uniquely addressed to the tag circuitry 502 and 602 using RFID transmission protocols) to selectively communicate with one of the tag circuitry 502 and 602 and control a variable modulator of each. For example, in the RFID tag 500, the variable modulator (which may be embodied as the variable modulator 138 shown in FIG. 1) includes three discrete impedance elements 504 (e.g., plural resistors of different values). In the RFID tag 600, the variable modulator (which may be embodied as the variable modulator 138 shown in FIG. 1) includes a variable impedance element 604 (e.g., a varactor or voltage controlled capacitor). In operation, the tag circuitry 502 and 602 receives an RFID signal that causes the tag circuitry 502 and 602 to control the three discrete impedance elements 504 or the variable impedance element 604 to change a modulating impedance of the RFID tag 500 or the RFID tag 600. Thus, using RFID control signals, the RFID reader 200 is able to communicate with the RFID tag 500 or the RFID tag 600 such that signals received from the RFID tag 500 or the RFID tag 600 by the RFID reader 200 at the same time may be resolved.

With reference to FIG. 5, the tag circuitry 502 is configured to selectively control a plurality of switching element, illustrated as switches 506 associated with each of the impedance elements 504 to variably change the impedance of the RFID tag 500. For example, the tag circuitry 502 is configured to selectively open or close one or more of the switches 506 to change the total impedance of the RFID tag 500. For example, by closing one or more of the switches 506, the impedance of the RFID tag 500 is changed (e.g., by selecting resistors having different values), which changes the phase of the backscatter state of the RFID tag to thereby rotate one of the tag constellations in the IQ plane when communicating via a communication device, for example, a transmitter/receiver 508 of the RFID tag 500, which may include or be embodied as an antenna.

Figure 7:
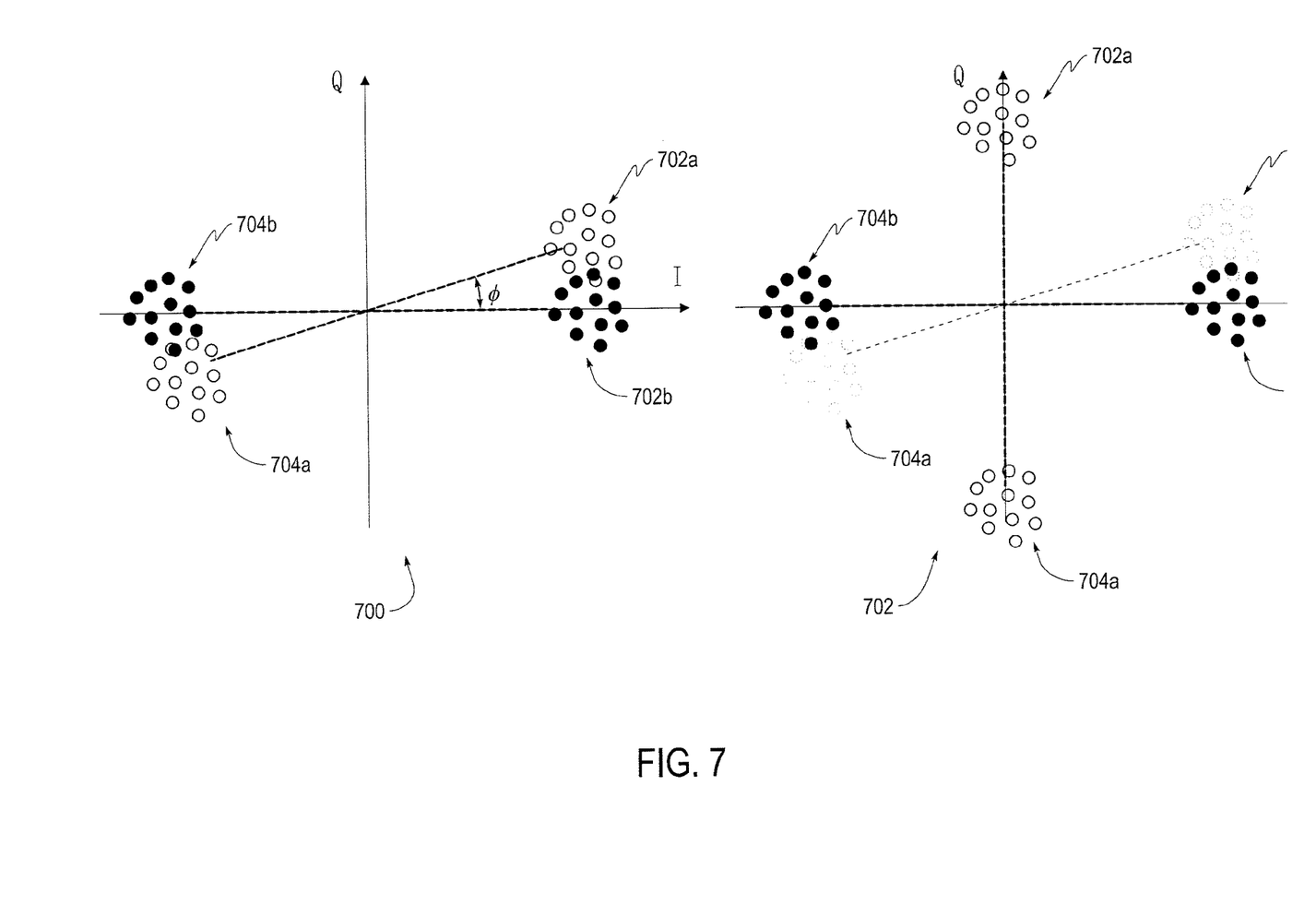
FIG. 7 illustrates constellation plots illustrating a phase shift in accordance with various embodiments.

In some embodiments, memory bits are addressed within the tag circuitry 502 (e.g., three addressable bit fields in the tag) to dynamically select one or more of the impedance elements 504 by opening or closing one or more of the switches 506. It should be appreciated that the impedance may be adjusted by selecting one of the impedance elements 504 or a combination of the impedance elements 504. Thus, as should further be appreciated, by dynamically changing the modulating impedance of the RFID tag 500 relative to other RFID tags 500 (or RFID tags 600 or other RFID tags that have a fixed impedance), the angle between tag constellations in the IQ plane is changed, allowing the RFID reader 200 to decode multiple tag signals at the same time as shown in FIG. 7. It should be noted that in various embodiments, the RFID reader 200 is a UHF RFID reader that employs I/Q demodulation using one or more RFID communication technology techniques.

Similarly, in the RFID tag 600, the tag circuitry 602 is configured to selectively change the variable impedance of the variable impedance element 604 by closing a switching element, illustrated as a switch 606, and sending a control signal to the variable impedance element 604 (e.g., by changing a voltage applied to the variable impedance element 604), which changes the phase of the backscatter state of the RFID tag 600 to thereby rotate one of the tag constellations in the IQ plane when communicating via a communication device, such as a transmitter/receiver 608 of the RFID tag 500. Thus, similar to the RFID tag 600, by dynamically changing the modulating impedance of the RFID tag 500 relative to other RFID tags 600 (or RFID tags 500 or other RFID tags that have a fixed impedance), the angle between tag constellations in the IQ plane is changed, allowing the RFID reader 200 to decode multiple tag signals at the same time as shown in FIG. 7.

It should be noted that the switching elements may be any type of switch 506 or 606, and are not limited to a particular type of physical or electrical switching arrangement. For example, in some embodiments, the switching element is a transistor connected to the transmitter/receiver 508 or transmitter/receiver 608, such as to an antenna. In this configuration, one or more transistors are connected in parallel with terminals of an antenna and driven by a bias signal from, for example, the tag circuitry 502 or 602. In this configuration, in operation, when the bias signal goes high, the transistor impedance goes low, and vice versa. In some embodiments, a plurality of impedance elements and a plurality of switching elements are provided as a plurality of transistors configured to operate as the plurality of impedance elements and the plurality of switching elements, wherein the plurality of transistors are connected to the antenna.

For example, the plots 700 and 702 in FIG. 7 illustrate signal constellation plots showing signal collisions at the RFID reader 200 when signals from two RFID tags are received by the RFID reader 200 at the same time. The RFID reader 200 uses signal processing techniques in the RFID processing technology to process the received RFID data over IQ channels to identify and validate the data from the RFID tag. The plots 700 and 702 are constellation diagrams representing signals modulated by a digital modulation scheme, such as quadrature amplitude modulation or phase-shift keying. The plots 700 and 702 illustrate the received signal as a two-dimensional X-Y plane scatter diagram in the complex plane at symbol sampling instants. The horizontal and vertical axes are the real and imaginary axes, also referred to as the in phase, or I-axis, and the quadrature, or Q-axis.

The plot 700 represents received signals from two RFID tags that do not include dynamic impedance modulation in accordance with various embodiments. As can be seen, the IQ components of the received signal (illustrated as state A and B clusters 702a, 702b and 704a, 704b) are close in angle and overlapping at some points. The close clustering of the IQ components from the two tags may be caused by, for example, changes in the environment such as noise caused by a passing object, which prevents the RFID reader 200 from resolving and decoding the signals from the two RFID tags that transmitted the signals having the illustrated IQ clusters. Ideally, in the IQ plane (representing the complex components of amplitude and phase), the clusters (IQ channels) would be offset by ninety degrees.

In operation, when using one the RFID tag 500 or the RFID tag 600 as, for example, Tag 1 and/or Tag 2 as shown in FIG. 7, the impedance modulation of one of the RFID tag 500 or the RFID tag 600 may be changed by selectively activating (switching on) one or more of the impedance elements 504 or the variable impedance element 604 to change the impedance of the RFID tag 500 or the RFID tag 600. With the change in impedance, the phase of the backscatter state of the RFID tag 500 or the RFID tag 600 changes, which causes a rotation of the tag constellations on the IQ plane as illustrated in plot 702. In the illustrated embodiment, the impedance of Tag 1 is dynamically changed, which effects a rotation in the Tag 1 constellations (illustrated by the clusters 702a and 704a) such that the Tag 1 constellations and the Tag 2 constellations are offset by ninety degrees. It should be noted that the rotation of the constellations may be more or less than ninety degrees depending on the change in modulating impedance. In the state shown in the plot 702, with the Tag 1 and Tag 2 constellations being mutually orthogonal, the RFID reader 200 can resolve and decode the received signals from both RFID tags at the same time. For example, an RFID reader in the art may be used to resolve the signals received at the same time from different RFID tags, such as to use the I component to resolve the signal from one RFID tag and the Q component to resolve the signal from the other RFID tag.

Thus, various embodiments allows for impedance modulation changes to effect a backscatter impedance change. For example, if the RFID reader 200 detects a collision in signals (e.g., the RFID reader 200 cannot resolve two received signals), the RFID reader 200 may instruct one of the RFID tags, such as the RFID tag 500 or the RFID tag 600 to change an input impedance value to thereby change the phase of the received signal. For example, the RFID reader 200 may communicate with the RFID tag 500 or the RFID tag 600, such as before reading one of the RFID tags 500 or 600 (during singulation or setup) or during a reading scan of the RFID tags 500 or 600. In various embodiments, the RFID reader 200 sends a control signal to the RFID tag 500 or 600, setting the states of the switches 504 and/or 606, as well as the value of variable impedance element 604. For example, as described herein, in order to activate the backscatter impedance change feature, the control signal is sent via a point to point or broadcast communication to the RFID tags 500 or 600. In each RFID tags 500 or 600, the control signal is sent to the tag circuitry 502 or 602. The tag circuitry 502 or 602 having the unique ID addressed within the control signal (as described herein) is thereby controlled, which results in the control of the dynamic impedance modulation changes described herein. For example, the RFID signal received by the tag circuitry 502 or 602 commands one or more of the switches 506 or switch 606 to change state.

The control signal may include a switch control command to control the state of the one or more switches. For example, in some embodiments, the switch control command includes a control signal instructions (or control data bits) to open or close the one or more switches, which causes the tag circuitry 502 or 602 to open or close the one or more switches (such as by activating the one or more of the switches, such as by sending a drive signal to switch the state of the one or more switches) to thereby change the impedance level. In some embodiments, the switch command includes a bias control signal that commands the tag circuitry 502 or 602 to send a bias signal to a transistor that is biased between high and low levels to change the impedance level.

Figure 8:
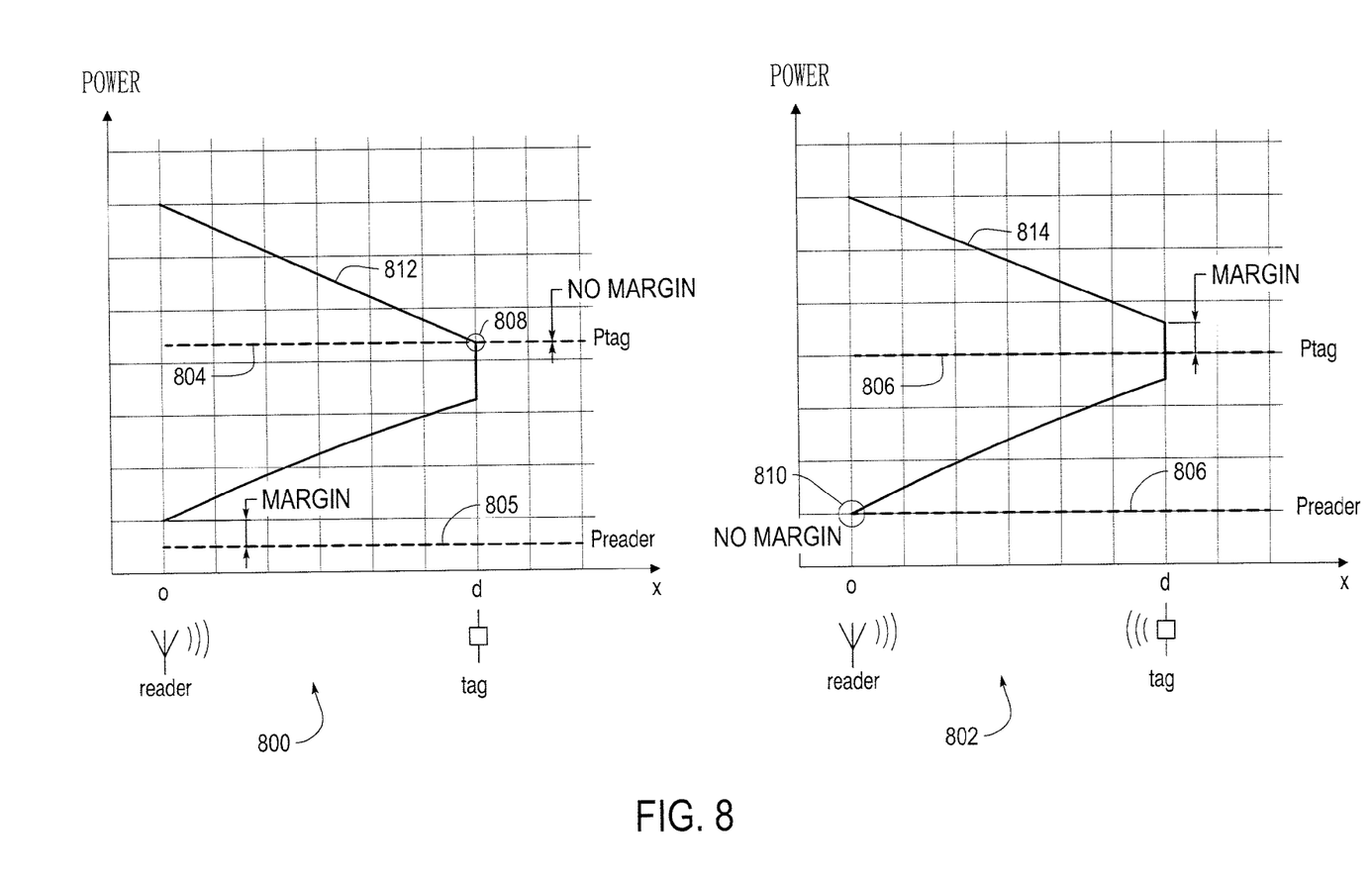
FIG. 8 illustrate power plots of limited link systems.
Figure 9:
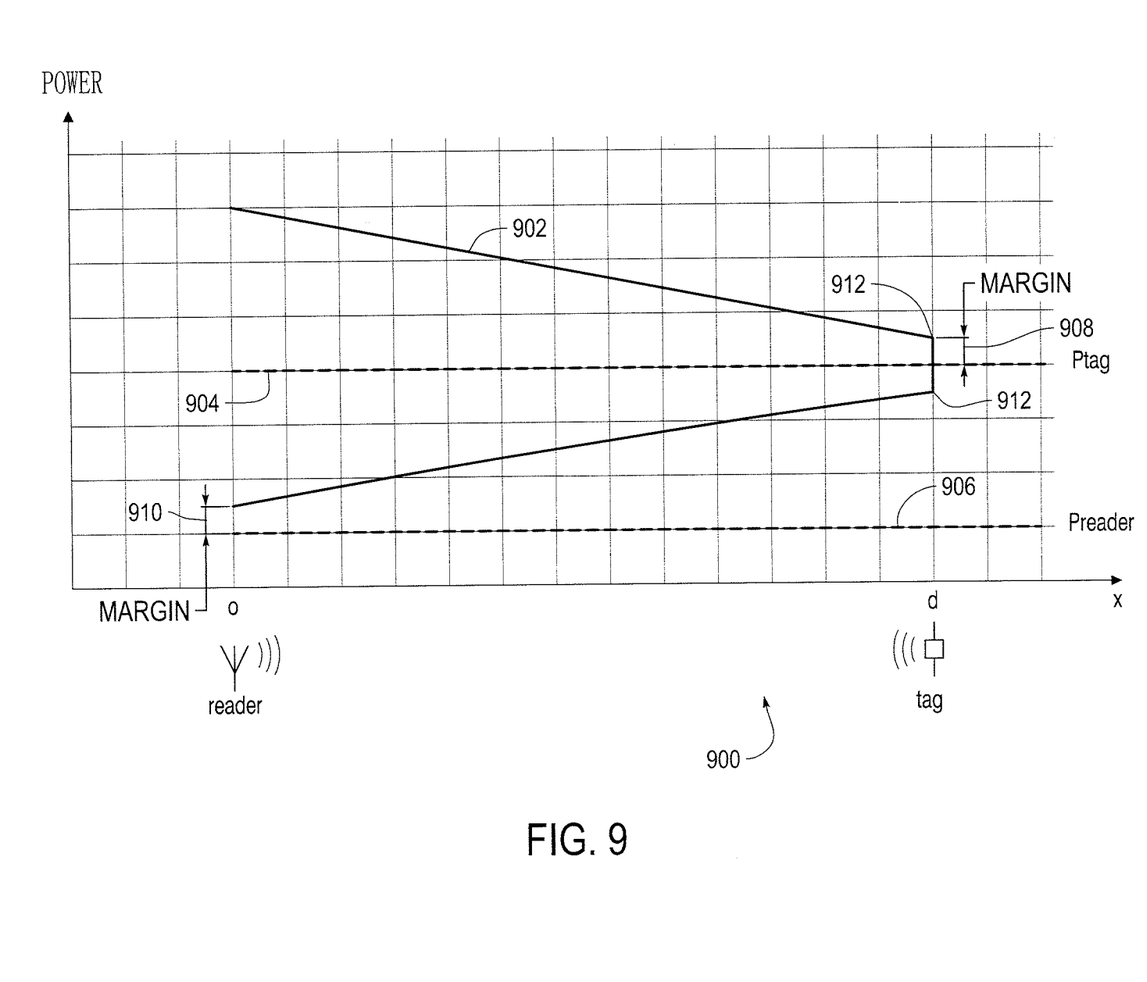
FIG. 9 illustrates a power plot in accordance with an embodiment.

In operation, the dynamic impedance modulation causes changes in the RF link margins as illustrated in FIGS. 8 and 9, illustrating power (vertical axis) as a function of distance (horizontal axis) between the RFID reader 200 and an RFID tag, such as the RFID tag 500 or 600. In the plots 800 and 802, the lines 804 and 806 represent a tag sensitivity threshold and the lines 805 and 806 represent an RFID reader sensitivity threshold. In particular, with respect to the plot 800, if the power decreases below the tag sensitivity threshold (i.e., below the line 804), the RFID tag will not power, and as such, the RFID tag cannot be read and/or if currently reading the RFID tag, the signal will be lost. As should be appreciated, the margin for loss is very small, as illustrated by the circle 808. For example, in some embodiments, a shift down by 1 decibel (dB) would result in the RFID tag not being powered. Thus, the plot 800 illustrates a forward (tag) limited system without an optimized forward link.

With respect to the plot 802, if the power decreases below the reader sensitivity threshold (i.e., below the line 806), the RFID tag will not power, and as such, the RFID tag cannot be read and/or if currently reading the RFID tag, the signal will be lost. As again should be appreciated, the margin for loss is very small, as illustrated by the circle 810. For example, in some embodiments, a shift down by 1 decibel (dB) would result in the RFID tag not being powered, such that the RFID tag cannot be read. Thus, the plot 802 illustrates a reverse (tag) limited system without an optimized reverse link.

In the plots, the lines 812 and 814 represent the signal in an ideal space. However, in many operating environments, people or other objects may move that affect the power corresponding to the lines 812 and 814. Because of the small margin between the power and the sensitivity of the tag and reader, such as illustrated in the circles 808 and 810, at these points, the likelihood of signal loss increases. Thus, changes in the RF environment, such as with the antenna or objects moving, can cause the RF link power to shift the below tag sensitivity threshold or the reader sensitivity threshold, resulting in loss of communication with the RFID tag.

FIG. 9 illustrates a plot 900 of a power curve illustrated by the line 902, wherein line 904 represents a tag sensitivity threshold and the line 906 represent an RFID reader sensitivity threshold. As can be seen in this plot 900, by dynamically adjusting the modulating impedance as described herein, which causes a phase change in the backscatter state of the RFID tag, the power curve is shifted (as compared with the plots 800 and 802), such that margins 908 and 910 to the tag sensitivity threshold and the reader sensitivity threshold represented by the lines 904 and 906 are increased (i.e., greater distance from the lines). Accordingly, more robust and reliable communication with multiple RFID tags, particularly transmitting at the same time, is provided.

In the illustrated embodiment, the power is shifted such that the power curve moves so that the tag sensitivity threshold represented by the line 904 is positioned midway between the end points 912 of the line 902. Thus, the margin for loss of signal is increased such that greater variations can be tolerated with the RFID tag remaining powered and able to be read.

Figure 10:
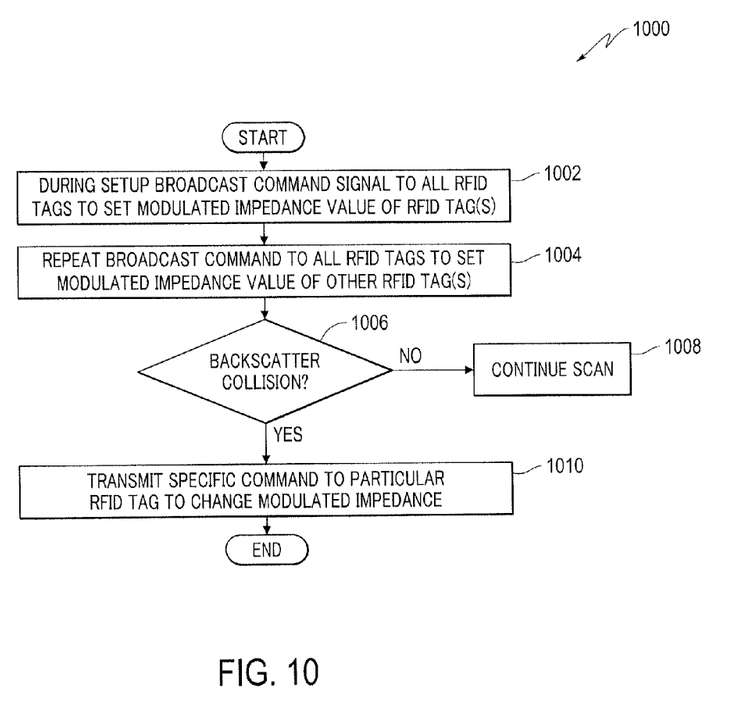
FIG. 10 illustrates a method for controlling impedances of RFID tags in accordance with an embodiment.

One or more embodiments include a method 1000 as illustrated in FIG. 10. With reference also to FIGS. 1-9, the method 1000 may be implemented or performed using one or more systems described herein, such as the system 100 and/or RFID apparatus 200. It should be noted that the steps of the method 1000 may be performed in a different order and some steps may be performed concurrently. Additionally, some steps may be repeated.

The method 1000 includes, during setup, such as during the singulation process, broadcasting a command signal (such as from the RFID reader 200) to all RFID tags at 1002 to set a modulated impedance value for the RFID tags. For example, the RFID tags may be the RFID tags 500 or 600 and the broadcast command instructs all of the RFID tags to change the modulated impedance to a specific value. In various embodiments, a random number generator may be used to generate a random number, such that each of the tags (e.g., each of 100 tags) selects or is assigned a random number. The broadcast command then instructs all of the RFID tags that are assigned number 1, to set the modulating impedance to a first value. Then, the broadcast command is repeated at 1004 to all of the RFID tags to have the RFID tags that are assigned a different number, such as the number 2, to set the modulated impedance at a second value, different than the first. This process is continued, for example, until all RFID tags with possible numbers have been assigned a modulating impedance.

As should be appreciated, there may be a limited number of impedances, such as with the RFID tag 500. In such a case, a determination is thereafter made (after the initial setup), such as during a read scan, as to whether there is a backscatter collision at 1006. If no collisions have occurred, then the read scan continues at 1008. However, if a collision has occurred, such as determined when a read signal from an RFID tag cannot be resolved and/or decoded, a specific command is transmitted to a particular RFID tag to change the modulating impedance thereof at 1010. For example, a command signal may be sent to switch one or more of the switches 506 to change the modulating impedance of the RFID tag 500 as discussed herein. Thus, a change in the backscatter state is effected to allow the RFID reader 200 to resolve and/or decode the signals received from multiple RFID tags at the same time. Additionally, the shift in phase can also change the power margin to a tag or reader sensitivity threshold as described herein.

Thus, various embodiments increase the likelihood of reliable RFID read operations.

It should be noted that one or more embodiments can comprise one or more microprocessors (which may be embodied as a processor) and a memory, coupled via a system bus. The microprocessor can be provided by a general purpose microprocessor or by a specialized microprocessor (e.g., an ASIC). In one embodiment, the system can comprise a single microprocessor which can be referred to as a central processing unit (CPU). In another embodiment, the system 100 can comprise two or more microprocessors, for example, a CPU providing some or most of the scanning functionality and a specialized microprocessor performing some specific functionality, such as to determine distance information and correlate that information with the acquired image information. A skilled artisan would appreciate the fact that other schemes of processing tasks distribution among two or more microprocessors are within the scope of this disclosure. The memory can comprise one or more types of memory, including but not limited to: random-access-memory (RAM), non-volatile RAM (NVRAM), etc.

It should be noted that, for example, the various embodiments can communicate between components using different standards and protocols. For example, the wireless communication can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiments were chosen and described in order to best explain the principles of embodiments and practical application, and to enable others of ordinary skill in the art to understand embodiments with various modifications as are suited to the particular use contemplated.

Furthermore, as will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described herein with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks and when implemented in one or more embodiments, results in a transforming or converting a general purpose computer/processor/hardware to a specialized computer/processor/hardware that improves the technological art.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A radio-frequency identification (RFID) tag comprising:
    an antenna;
    at least one discrete circuit component that is connected to the antenna and that contributes to an impedance of the RFID tag, which is variable;
    at least one switch connected to the at least one discrete circuit component;
    a receiver that receives a control signal from an RFID reader; and
    a controller connected to the at least one switch and, in response to the RFID tag receiving the control signal from the RFID reader, operates the switch between open and closed states to change the impedance of the RFID tag between a first modulating impedance value and a second modulating impedance value and a signal that is transmitted from the RFID tag is different depending on the switch state,
    wherein an initiation signal is sent, by an RFID reader, to a first RFID tag being the RFID tag and also to a second RFID tag to set impedances of the first and second RFID tags to a default value, and the control signal is sent to the first RFID tag instructing the impedance of the first RFID tag to be switched but the control signal is not sent to the second RFID tag, so that the first RFID tag has an impedance that differs from the second RFID tag based on the control signal.

2. The RFID tag of claim 1, wherein the at least one discrete circuit component element comprises a variable impedance element and the controller is further configured to dynamically set a modulating impedance value of the at least one discrete circuit component such that the second modulating impedance value is a variable value.

3. The RFID tag of claim 1, further comprising a plurality of impedance elements and a plurality of switches, wherein each of the impedance elements is connected to a respective switch.

4. The RFID tag of claim 1, wherein the switch comprises at least one of a transistor or a switch that opens/closes a circuit portion.

5. The RFID tag of claim 3, wherein the controller is further configured to dynamically control the open and closed states of the switch to change the second modulating impedance value between a plurality of values.

6. The RFID tag of claim 3, wherein each of the impedance elements is a resistor, each of the resistors having a different resistance value.

7. The RFID tag of claim 1, wherein the at least one discrete circuit component comprises one of a varactor or a voltage controlled capacitor.

8. The RFID tag of claim 1, wherein the controller is configured to dynamically set the second modulating impedance value.

9. The RFID tag of claim 1, wherein the controller is configured to generate a random number during setup, the second modulating impedance value set based on a command signal from the RFID reader corresponding to the random number.

10. A radio-frequency identification (RFID) system comprising:
  a first RFID tag comprising:
    an impedance element configured to change an impedance value of the RFID tag; and
    a controller connected to the impedance element and configured to dynamically adjust the modulating impedance value by controlling operation of the impedance element; and
  a second RFID tag,
  wherein the control signal is sent to the first RFID tag instructing the impedance of the first RFID tag to be adjusted but the control signal is not sent to the second RFID tag, so that the first RFID tag has an impedance that differs from the second RFID tag based on the control signal.

11. The RFID system of claim 10, wherein the first RFID tag further comprises a switch connected to the impedance element and the controller is configured to control operation of the switch.

12. The RFID system of claim 10, wherein the impedance element comprises a variable impedance element.

13. The RFID system of claim 10, wherein the first RFID tag further comprises a plurality of switches and a plurality of impedance elements each connected to a respective switch, wherein the controller is configured to control the switches to select one or more of the impedance elements to dynamically adjust the modulating impedance value.

14. The RFID system of claim 10, wherein the controller is configured to receive a broadcast command from an RFID reader to set the modulating impedance value.

15. The RFID system of claim 10, wherein the controller is configured to receive a tag specific command from an RFID reader to set the modulating impedance value.

16. The RFID system of claim 10, wherein the controller is configured to dynamically adjust the modulating impedance value based on a control command from an RFID reader that is transmitted based on one of a detected backscatter collision or an operating condition of the RFID reader.

17. The RFID system of claim 10, wherein the controller is configured to dynamically adjust the modulating impedance value between a plurality of discrete impedance values, including combinations of the discrete impedance values.

18. The RFID system of claim 10, wherein the controller is configured to dynamically adjust the modulating impedance value between a plurality variable impedance values.

19. A method comprising:
  sending a first signal to a first RFID tag and a second RFID tag to set a modulating impedance value for each of the first and second RFID tags using one or more broadcast command signals; and
  sending a control signal, from an RFID reader, to the first RFID tag, but not the second RFID tag, instructing the impedance value of the first RFID tag to be changed in response to a detected backscatter collision between signals from the first and second RFID tags received by the RFID reader at the same time.

20. The method of claim 19, further comprising dynamically controlling at least one switch in each of the RFID tags to change the modulating impedance value.

* * * * *